(12) United States Patent
Jin et al.

(10) Patent No.: US 9,088,458 B2
(45) Date of Patent: Jul. 21, 2015

(54) METHOD AND APPARATUS FOR NOTIFYING REMOTE USER INTERFACE CLIENT ABOUT EVENT OF REMOTE USER INTERFACE SERVER IN HOME NETWORK

(71) Applicant: SAMSUNG ELECTRONICS CO., LTD., Suwon-si, Gyeonggi-do (KR)

(72) Inventors: Ho Jin, Yongin-si (KR); Young-chul Sohn, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/942,345

(22) Filed: Jul. 15, 2013

(65) Prior Publication Data
US 2013/0304919 A1 Nov. 14, 2013

Related U.S. Application Data

(63) Continuation of application No. 12/535,982, filed on Aug. 5, 2009, now abandoned.

(60) Provisional application No. 61/086,245, filed on Aug. 5, 2008.

(30) Foreign Application Priority Data

Dec. 9, 2008 (KR) ........................ 10-2008-0124746

(51) Int. Cl.
*G06F 7/04* (2006.01)
*H04L 29/08* (2006.01)
(Continued)

(52) U.S. Cl.
CPC ................ *H04L 29/08* (2013.01); *G06F 9/542* (2013.01); *H04L 12/2825* (2013.01); *H04L 63/08* (2013.01); *G06F 2209/545* (2013.01)

(58) Field of Classification Search
CPC .... H04L 63/08; H04L 63/102; G06F 21/6218
USPC ............................................................. 726/4
See application file for complete search history.

(56) References Cited

U.S. PATENT DOCUMENTS 7,657,928 B2 * 2/2010 Shima et al. ....................... 726/3
8,161,290 B2 * 4/2012 McQuaide, Jr. ............... 713/186
(Continued)

FOREIGN PATENT DOCUMENTS

| CN | 1466332 A | 1/2004 |
| CN | 101228769 A | 7/2008 |

(Continued)

OTHER PUBLICATIONS

Jeong, J. et al., "Secure User Authentication Mechanism in Digital Home Network Environments", Embedded and Ubiquitous Computing, 2006, pp. 345-354.

(Continued)

*Primary Examiner* — Teshome Hailu
(74) *Attorney, Agent, or Firm* — Sughrue Mion, PLLC

(57) ABSTRACT

An event notifying method includes determining whether a current home network, which is currently connected to a remote user interface server (RUIS) in a home network, is a user's home network selected by a user so as to be allowed to be notified of the event, selectively providing an event page to a remote user interface client (RUIC) selected by a user in the user's home network, and performing user authentication prior to providing the event page, thereby ensuring security of the user's private information.

14 Claims, 7 Drawing Sheets

(51) Int. Cl.
  *G06F 9/54* (2006.01)
  *H04L 12/28* (2006.01)
  *H04L 29/06* (2006.01)

(56) References Cited

U.S. PATENT DOCUMENTS

| | | | |
|---|---|---|---|
| 8,175,104 B2* | 5/2012 | Connelly et al. | 370/401 |
| 8,353,011 B2 | 1/2013 | Bajko et al. | |
| 2002/0163534 A1* | 11/2002 | Choi et al. | 345/734 |
| 2003/0037139 A1 | 2/2003 | Shteyn | |
| 2003/0234811 A1 | 12/2003 | Kim | |
| 2004/0193920 A1 | 9/2004 | Kiss et al. | |
| 2004/0249902 A1 | 12/2004 | Tadayon et al. | |
| 2004/0254995 A1* | 12/2004 | Oka et al. | 709/206 |
| 2005/0202390 A1* | 9/2005 | Allen et al. | 434/353 |
| 2006/0218625 A1* | 9/2006 | Pearson et al. | 726/4 |
| 2006/0242069 A1* | 10/2006 | Peterka et al. | 705/50 |
| 2006/0280305 A1* | 12/2006 | Bajko et al. | 380/270 |
| 2007/0089055 A1* | 4/2007 | Ko et al. | 715/700 |
| 2007/0121584 A1* | 5/2007 | Qiu et al. | 370/352 |
| 2007/0174300 A1* | 7/2007 | Kim | 707/10 |
| 2007/0174301 A1* | 7/2007 | Kim et al. | 707/10 |
| 2008/0207984 A1* | 8/2008 | Alekseyenko et al. | 600/9 |
| 2008/0282182 A1 | 11/2008 | Oosaka | |
| 2014/0189820 A1* | 7/2014 | Pieczul et al. | 726/5 |

FOREIGN PATENT DOCUMENTS

| | | |
|---|---|---|
| EP | 1091601 A2 | 4/2001 |
| KR | 10-2006-0101319 A | 9/2006 |
| KR | 10-2007-0048658 A | 5/2007 |
| KR | 10-0803610 B1 | 2/2008 |
| KR | 10-2008-0065505 A | 7/2008 |
| WO | 2007/102548 A1 | 9/2007 |

OTHER PUBLICATIONS

International Search Report and Written Opinion issued in counterpart International Application No. PCT/KR2009/004367 dated Mar. 16, 2010.
Communication, dated Apr. 1, 2013, issued by the State Intellectual Property Office of P.R. China in counterpart Chinese Patent Application No. 200980131040.7.
Communication from the European Patent Office issued Oct. 26, 2012 in counterpart European Application No. 09805185.7.
Communication dated Oct. 29, 2013 issued by the State Intellectual Property Office of the People's Republic of China in counterpart Chinese Patent Application No. 200980131040.7.
Communication dated Jun. 3, 2014, issued by the State Intellectual Property Office of the People's Republic of China in counterpart Chinese Application No. 200980131040.7.
Communication dated Dec. 3, 2014, issued by the State Intellectual Property Office of P.R. China in counterpart Chinese Application No. 200980131040.7.
"Web-based Protocol and Framework for Remote User Interface on UPnP Networks and the Internet (Web4CE)", Jul. 2007, Consumer Electronics Association (CEA), Arlington, Virginia, U.S.A.
Communication dated May 8, 2015 issued by Korean Intellectual Property Office in counterpart Korean Application No. 10-2008-0124746.

* cited by examiner

FIG. 5A

| URL (realm) | AUTHENTICATION INFORMATION MANAGEMENT<br>o : Save Password |
|---|---|
| 192.10.10.11:5678 | o  (Authentication:Basic QWxh...) |
| 192.10.10.12:5554 | x |
| 192.10.10.13:4356 | x |

FIG. 5B

| Device UUID (RUIC) | IP Address | AUTHENTICATION INFORMATION MANAGEMENT<br>o : Save Password |
|---|---|---|
| 123-45-3456 | 192.1.10.11:5678 | o  (PW:q123e5) |
| 324-56-4321 | 192.1.10.12:5554 | x |
| 331-45-1234 | 192.1.10.13:4356 | x |

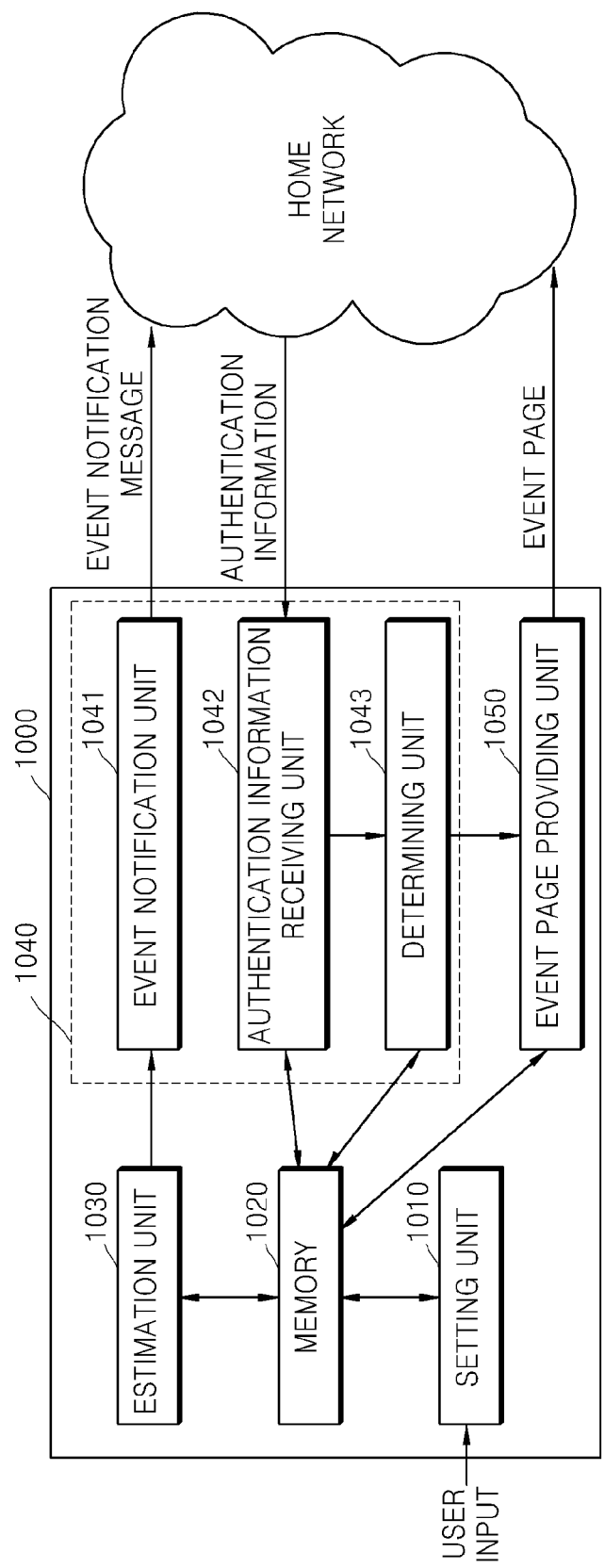

METHOD AND APPARATUS FOR NOTIFYING REMOTE USER INTERFACE CLIENT ABOUT EVENT OF REMOTE USER INTERFACE SERVER IN HOME NETWORK

CROSS-REFERENCE TO RELATED PATENT APPLICATION

This application is a Continuation Application of U.S. application Ser. No. 12/535,982 filed Aug. 5, 2009, which claims the benefit of U.S. Provisional Patent Application No. 61/086,245, filed on Aug. 5, 2008, in the U.S. Patent and Trademark Office, and the benefit of Korean Patent Application No. 10-2008-0124746, filed on Dec. 9, 2008, in the Korean Intellectual Property Office, the disclosures of which are incorporated herein in their entirety by reference.

BACKGROUND OF THE INVENTION

1. Field of the Invention

The present invention relates to a method of notifying a remote user interface client (RUIC) about an event occurring in a remote user interface server (RUIS) in a home network.

2. Description of the Related Art

As various home electronic devices develop enhanced networking functions, a home network needs various types of devices. Further, users can use various services provided by devices in the home network or services provided by an external service provider of the home network. Thus, there is a need to notify all home network devices (hereinafter referred to as "devices") about an event that occurs with respect to a single service.

Since the home network is a user's area, a user prefers to be informed of all events that occur with respect to a service used by the user within the home network, irrespective of the type of device currently being used by the user. In more detail, the user may be notified in real-time about an event that occurs with regard to another device in which the user is not interested.

An example of a home network specification adopting such a framework is the Consumer Electronics Association (CEA)-2014. The CEA-2014 publishes technologies for using a service provided by another device of a home network, or a server over the Internet, through a remote user interface in a home electronic device, such as a digital TV. A more detailed description is disclosed in the CEA-2014 specification and is not repeated here.

FIG. 1 is a block diagram for explaining a conventional method of notifying a remote user interface client (RUIC) about an event in a home network. The home network is a CEA-2014 based network and the method describes a method based on the CEA-2014 specification.

In operation 0, the RUIC forms a remote user interface (RUI) session with a remote user interface server (RUIS). That is, the RUIC displays a user interface (UI) page of the RUIS in the format of an extensible hypertext markup language (XHTML). A user uses a service of the RUIS through the UI page.

In operation 1, an event occurs in a service of another RUIS and the RUIC is notified about the event. The RUIS in which the event occurs is a $3^{rd}$ party that does not form the RUI session with the RUIC.

In operation 2, a $3^{rd}$ party event handler of the RUIC invokes an XHTML browser.

In operations 3 and 4, the XHTML browser browses an XHTML page including an event from the $3^{rd}$ party through an HTTP GET instruction, and provides the content of the event to a user. For reference, a uniform resource locator (URL) of the XHTML page including the event is contained in an event notification page that the $3^{rd}$ party transmits to the RUIC in operation 1.

As described above, since all home network devices in the home network adopting a $3^{rd}$ party event notification framework are notified about an event, the user can be informed of the occurrence of all events through any home network device.

However, the user may not want to display an event of the RUIS on all RUICs. For example, when the user is watching TV with his or her family, the user may not want to display a short message received by his or her cellular phone (that is, a RUIS) on the TV. In addition, when a user is at his or her friend's home, the user may not want to display a short message received by the user's cellular phone on a friend's TV.

SUMMARY OF THE INVENTION

The present invention provides a method and apparatus of selectively notifying a remote user interface client (RUIC) about an event by selectively providing an event page to the RUIC in a home network, which is performed by a remote user interface server (RUIS).

According to an aspect of the present invention, there is provided a method of notifying a remote user interface client (RUIC) about an event occurring in a remote user interface server (RUIS) in a home network, which is performed in the RUIS, the method including performing authentication with respect to a remote user interface client (RUIC), determining whether the RUIC is authorized to display the event based on a result of the authentication; and selectively transmitting an event page indicating content of the event, based on a result of the determination, to the RUIC.

The performing of the authentication may include transmitting an event notification message in which a uniform resource locator (URL) of an event page is replaced with a URL of an authentication page; receiving authentication information input by the user through an HTTP POST command from the authentication page; and determining whether the authentication is successful based on the authentication information.

The performing of the authentication may include transmitting an HTTP 401 Login Required message in response to an HTTP GET command with respect to the event page; receiving authentication information input by the user from the RUIC through the HTTP GET command of the authentication window; and determining whether the authentication is successful, using the authentication information.

According to another aspect of the present invention, there is provided a computer readable recording medium having recorded thereon a program for causing a computer to execute the method.

According to another aspect of the present invention, there is provided an apparatus for notifying a remote user interface client (RUIC) about an event in a remote user interface server (RUIS) in a home network, the apparatus including an authentication performing unit that performs authentication with respect to a remote user interface client (RUIC) and determines whether the RUIC is authorized to display the event; and an event page providing unit that selectively transmits an event page indicating content of the event, based on a result of the determining, to the RUIC.

The authentication performing unit may include an event notification unit that transmits an event notification message in which a uniform resource locator (URL) of an event page is replaced with a URL of an authentication page; an authentication information receiving unit that receives authentication information input by a user through an HTTP POST command from the authentication page; and a determining unit that determines whether the authentication is successful based on the authentication information.

The authentication performing unit may include an authentication information receiving unit that transmits an HTTP 401 Login Required message in response to an HTTP GET command with respect to the event page and receives authentication information input by a user from the RUIC through the HTTP GET command of an authentication window displayed in response to the transmitting; and a determining unit that determines whether the authentication is successful based on the authentication information.

According to another aspect of the present invention, there is provided a method of notifying a remote user interface client (RUIC) an event occurring in a remote user interface server (RUIS), which is performed by the RUIS, the method including: determining whether a current home network that is currently connected to the RUIS is a selected home network that is allowed to be notified about the event; and selectively transmitting an event page indicating the event to at least one remote user interface client (RUIC) belonging to the current home network, based on a result of the determining.

The determining may include determining whether at least one selected device discovered in the selected home network is discovered in the current home network and determining whether the current home network is the selected home network based on a result of the determining whether at least one selected device discovered in the selected home network is discovered in the current home network.

The transmitting may include transmitting the event page to at least one RUIC that is previously selected by a user's input, in one of a unicast and a multicast method.

According to another aspect of the present invention, there is provided an apparatus for notifying a remote user interface client (RUIC) about an event in a remote user interface server (RUIS), the apparatus including an estimation unit that determines whether a current home network that is currently connected to the RUIS is a selected home network that is allowed to be notified about the event; and an event page providing unit that selectively transmits an event page indicating the event to at least one remote user interface client (RUIC) belonging to the current home network, based on a result of the determining.

BRIEF DESCRIPTION OF THE DRAWINGS

The above and other aspects of the present invention will become more apparent by describing in detail exemplary embodiments thereof with reference to the attached drawings in which:

FIG. 5A is an authentication information table managed by an RUIC, according to an exemplary embodiment of the present invention;

FIG. 5B is an authentication information table managed by a remote user interface server (RUIS), according to an exemplary embodiment of the present invention;

FIG. 10 is a block diagram for explaining a structure of an RUIS device according to an exemplary embodiment of the present invention.

DETAILED DESCRIPTION OF THE INVENTION

Hereinafter, the present invention will be described in detail by explaining exemplary embodiments of the invention with reference to the attached drawings.

Figure 1:
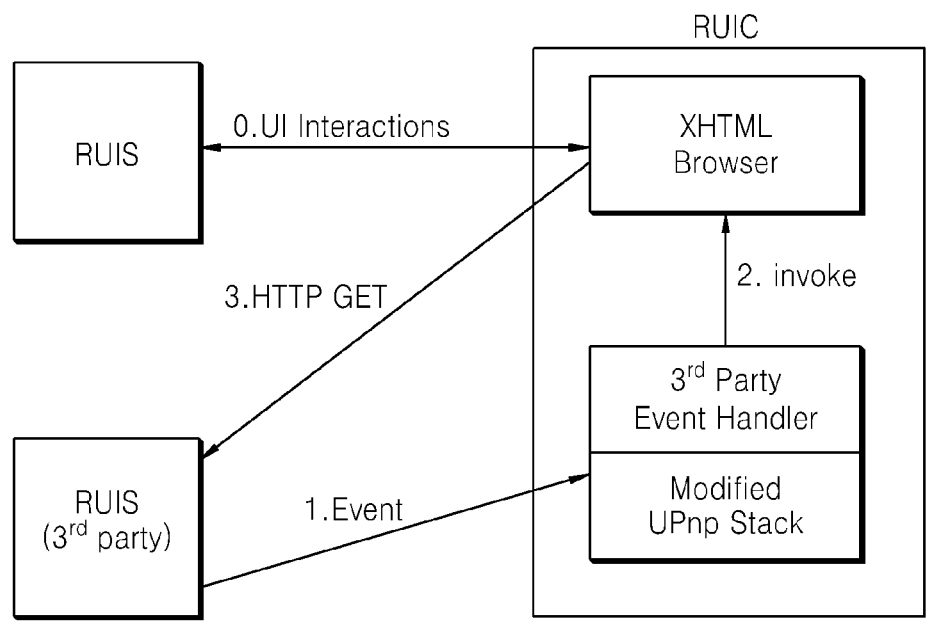
FIG. 1 is a block diagram for explaining a conventional method of notifying a remote user interface client (RUIC) about an event in a home network.
Figure 2:
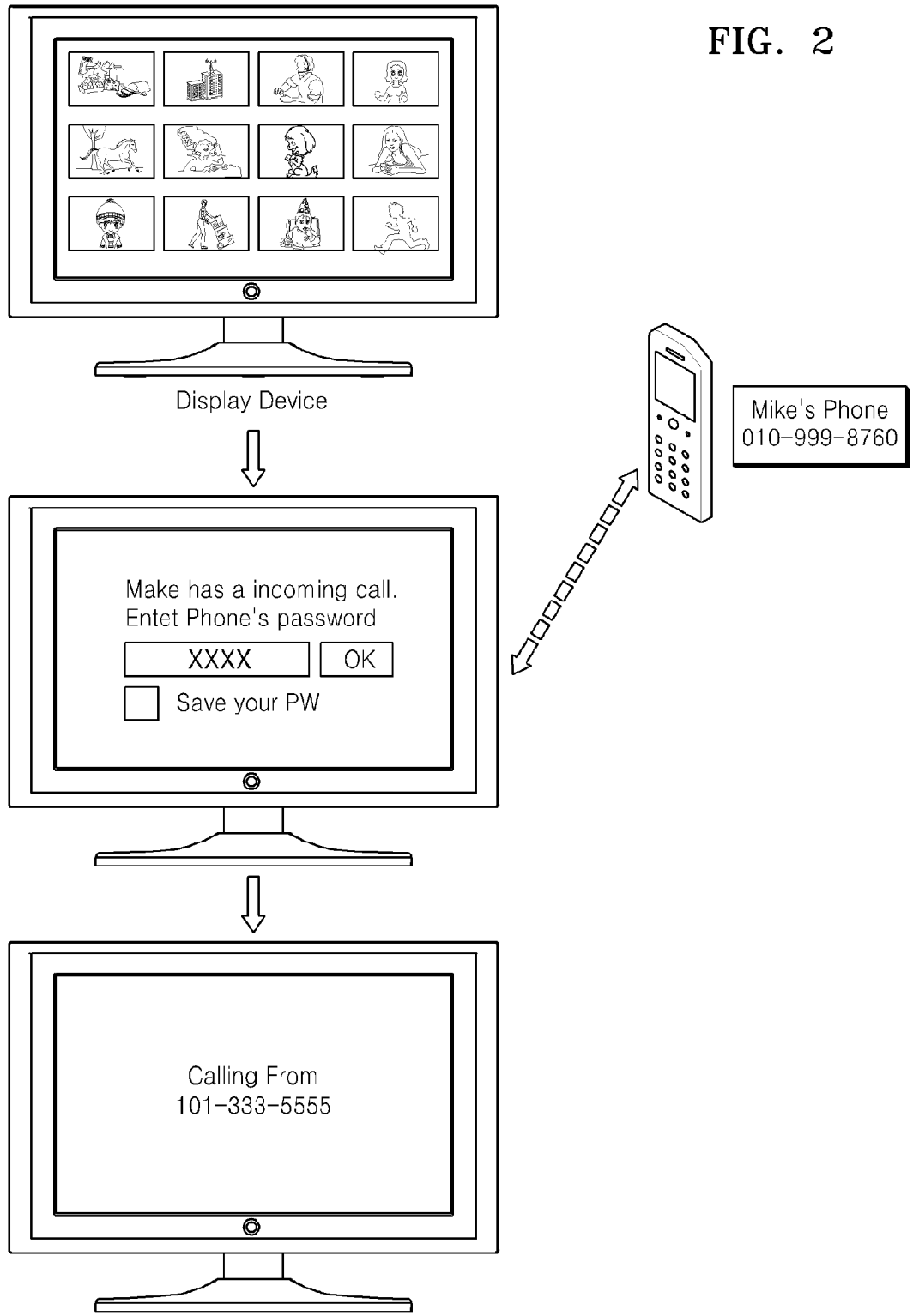
FIG. 2 is a diagram for explaining a method of notifying an RUIC about an event according to an exemplary embodiment of the present invention.

FIG. 2 is a diagram for explaining a method of notifying a remote user interface client (RUIC) about an event according to an embodiment of the present invention.

In the present exemplary embodiment, a television (TV) functions as the RUIC and a cellular phone functions as a remote user interface server (RUIS). Referring to FIG. 2, while a viewer named Mike is watching the TV with his family, even if he receives a call on the cellular phone, the caller's identification ID is not immediately displayed on the TV.

Instead, an authentication page for performing user authentication is displayed on the TV in order to determine whether the caller's ID is to be displayed.

If Mike inputs correct authentication information through the authentication page, the caller's ID is displayed on the TV. The authentication information may be a password that may be previously set by Mike in the cellular phone or may be previously defined between the RUIS and the RUIC. However, the password set in the cellular phone may be used in order to check the content of an event by using an RUIC.

According to the present exemplary embodiment, an event occurring in the RUIS is displayed on the corresponding RUIC only when the user authentication is successful, and thus the user's privacy may be ensured.

Figure 3:
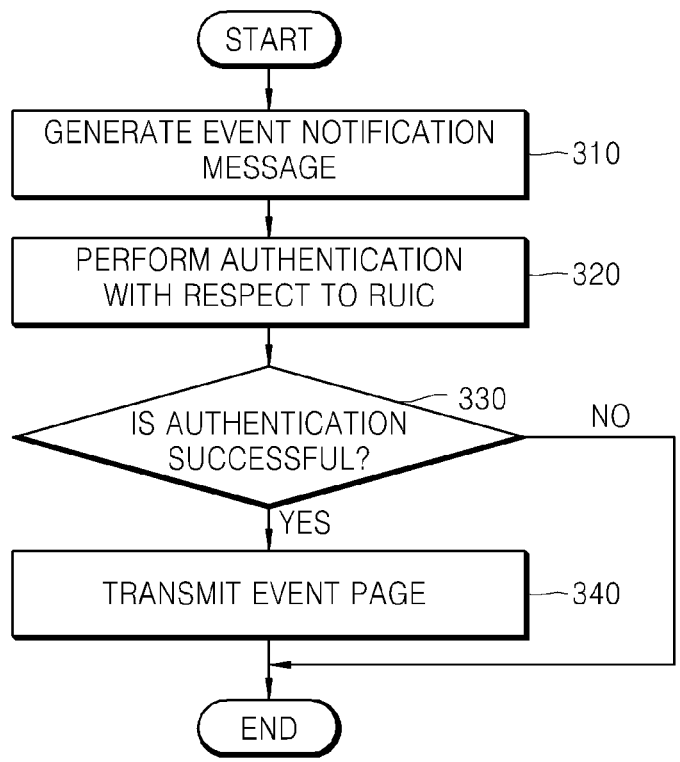
FIG. 3 is a flowchart of a method of notifying an RUIC about an event through user authentication, which is performed by a remote user interface server (RUIS), according to an exemplary embodiment of the present invention.

FIG. 3 is a flowchart of a method of notifying an RUIC about an event through user authentication, which is performed by an RUIS, according to an exemplary embodiment of the present invention.

In operation 310, the RUIS generates an event notification message when an event occurs.

In operation 320, the RUIS performs user authentication in order to check whether an RUIC is authorized to display the event.

Preferably, Authentication information input by a user may be transmitted to the RUIS via a secure channel.

In order for the RUIC to display an authentication page for performing the user authentication, instead of an event page on which content of the event is displayed, a uniform resource locator (URL) of the event page included in the event notification message may be replaced with a URL of the authentication page. When the user inputs the authentication information via the authentication page, the RUIS receives the authentication information through HTTP POST.

Alternatively, HTTP authentication is used. That is, while the URL of the event page is used in the event notification message, an HTTP 401 Login Required message may be transmitted in response to an HTTP GET instruction of the RUIC. In this case, an authentication window is displayed on a screen of the RUIC, and the user may input the authentication information via the authentication window. When the user inputs the authentication information via the authentication window, the RUIS receives the authentication information through HTTP GET.

In operation 330, the RUIS determines whether the authentication information input by the user is correct.

In operation 340, when the authentication is successful, the RUIS provides the event page to the RUIC.

Figure 4:
FIG. 4 is a diagram illustrating an authentication page displayed on an RUIC, according to an exemplary embodiment of the present invention.

FIG. 4 is a diagram illustrating an authentication page displayed on an RUIC, according to an exemplary embodiment of the present invention.

Whenever an event occurs, if a user needs to input authentication information each time, the user may feel annoyed, or may prefer to omit user authentication in a selected RUIC.

Referring to FIG. 4, when the authentication page is displayed on the RUIC, if the user puts a check in a check box of "save your PW", the authentication information is stored in an RUIS, a local memory of the RUIC, or an external memory. The authentication information may be stored through an application programming interface (API) of a selected plug-in, or a CEA-2014-standard Save & Restore function may be used.

After the authentication information is stored, since the RUIS and the RUIC perform the user authentication by using the stored authentication information, if the user inputs the authentication information once, the user is not required to input the authentication information when a next event occurs.

In the present exemplary embodiment, a storage device for storing the authentication information is not limited to any selected device. Thus, the authentication information may be stored in the RUIS, the RUIC, or another device. The case where the authentication information is stored in the RUIC will be described with reference to FIG. 5A. The case where the authentication information is stored in the RUIS will be described with reference to FIG. 5B.

FIG. 5A is an authentication information table managed by an RUIC, according to an exemplary embodiment of the present invention.

In the present exemplary embodiment, it is assumed that authentication information input by a user is stored in the RUIC and access to an event page is performed through HTTP authentication.

Referring to FIG. 5A, mappings between a URL of an RUIS and an authentication key are defined, where the URL is extracted from an event notification message, and the authentication key is generated using the authentication information input by the user during an initial authentication process with respect to a corresponding event.

Next, when the RUIC receives the event notification message, the RUIC extracts a URL from the RUIC, and then determines whether corresponding authentication information, whose mapping is defined with respect to the extracted URI, exists in the authentication information table. When the corresponding authentication information exists in the authentication information table, the RUIC inserts the corresponding authentication information into an HTTP GET command for accessing the event page. The RUIC receiving the HTTP GET command checks whether the authentication is correct, and then provides the event page, instead of an authentication window or an authentication page, to the RUIC. Thus, when an event occurs in the RUIS that displays a page for Internet Protocol (IP) address 192.10.10.11:5678, the RUIC displays the event page immediately, rather than displaying the authentication window or the authentication page.

In a general HTTP authentication communication process, when an XHTML browser in an active state repeatedly accesses a selected URL, session information such as cookie information may be used. However, when the XHTML browser is closed, the session information may be deleted. Thus, when the XHTML browser accesses the selected URL, the user needs to input the authentication information again. However, in the RUIC according to the present exemplary embodiment, even if the XHTML browser is closed, the authentication information used in the initial authentication process with respect to the RUIS may be stored.

FIG. 5B is an authentication information table managed by an RUIS, according to an exemplary embodiment of the present invention.

In an initial authentication process, when a user inputs authentication information, an RUIC inserts the authentication information into an HTTP GET command requesting an event page of the RUIS. When the initial authentication is successful, the RUIS generates the authentication information table in which mappings between the authentication information and identification (ID) of a corresponding RUIC are defined, and stores the authentication information table in a local memory or an external memory. Various pieces of information such as a universally unique identifier (UUID) and/or a provider's IP address may be used as the ID of the RUIC.

Referring to FIG. 5B, mappings between authentication information and an IP address of the RUIC are defined.

Next, when the RUIS receives an HTTP command for accessing the event page, the RUIS extracts an ID of the RUIC from the HTTP command, and then determines whether corresponding authentication information, whose mapping is defined with respect to the extracted ID, exists in the authentication information table. When the corresponding authentication information exists in the authentication information table, the RUIS omits an authentication process, and the RUIS provides the event page to the RUIC. Thus, according to the present exemplary embodiment, when an event occurs in the RUIS, the RUIC displaying UUID 123-45-3456 displays the event page immediately, rather than displaying an authentication window or an authentication page.

Figure 6:
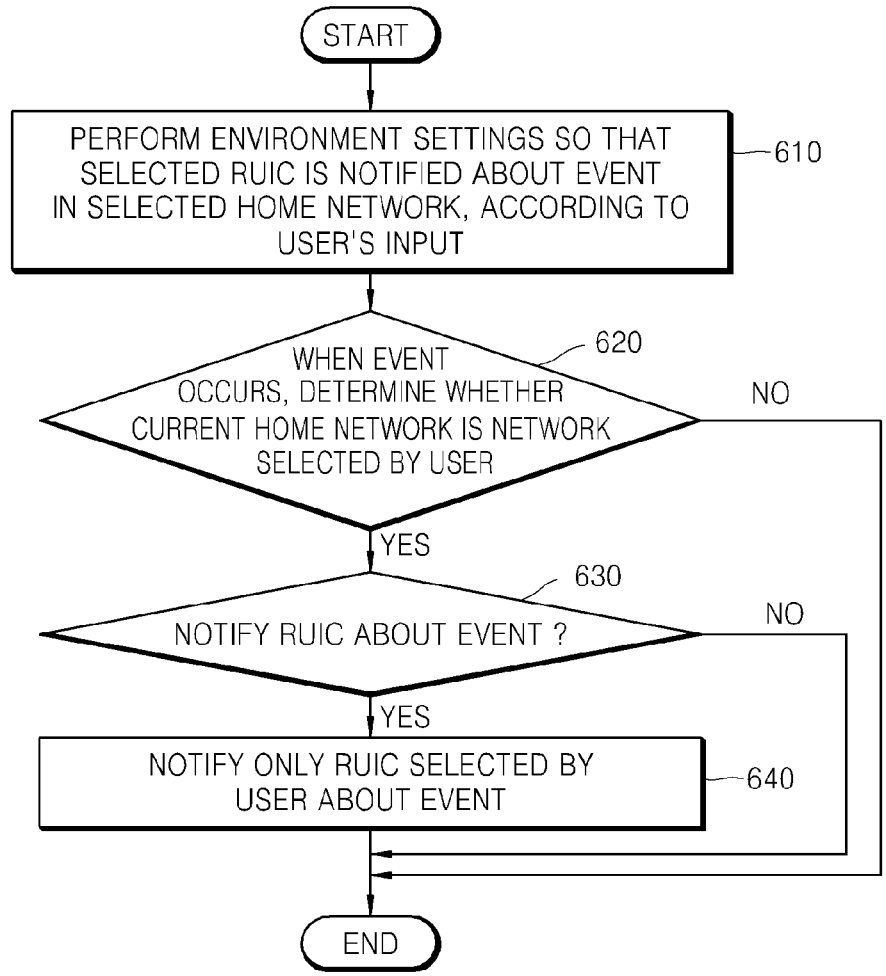
FIG. 6 is a flowchart of a method of notifying an RUIC about an event, which is performed by an RUIS on a selected home network, according to an exemplary embodiment of the present invention.

FIG. 6 is a flowchart of a method of notifying an RUIC about an event, which is performed by an RUIS in a selected home network, according to an embodiment of the present invention.

In operation 610, the RUIS performs environment settings so that only a selected RUIC is notified about an event in a selected home network (hereinafter, referred to as a user home network), according to user's input. For example, at least one RUIC is selected as a standard RUIC from among RUICs belonging to the user home network, and an ID (e.g., an IP address) of the selected RUIC is stored, as illustrated in FIGS. 7 and 8.

Figure 7:
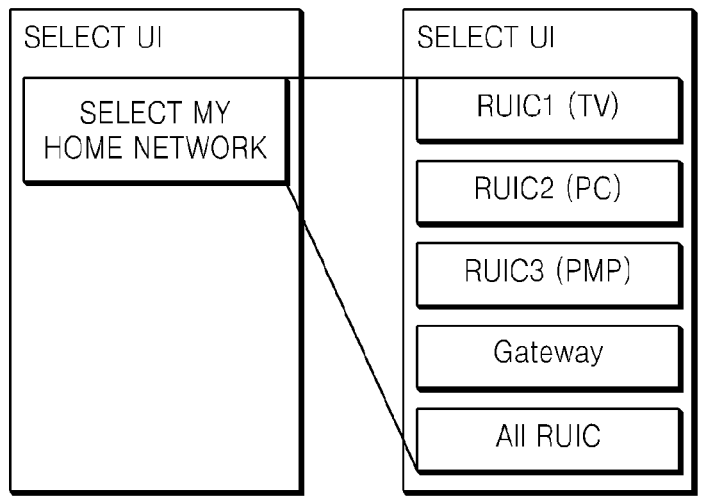
FIG. 7 is a diagram illustrating an image provided by an RUIS, for selecting a standard RUIC, according to an exemplary embodiment of the present invention.

FIG. 7 is a diagram illustrating an image provided by an RUIS, for selecting a standard RUIC, according to an exemplary embodiment of the present invention. A user may select the standard RUIC via the image illustrated in FIG. 7.

Figure 8:
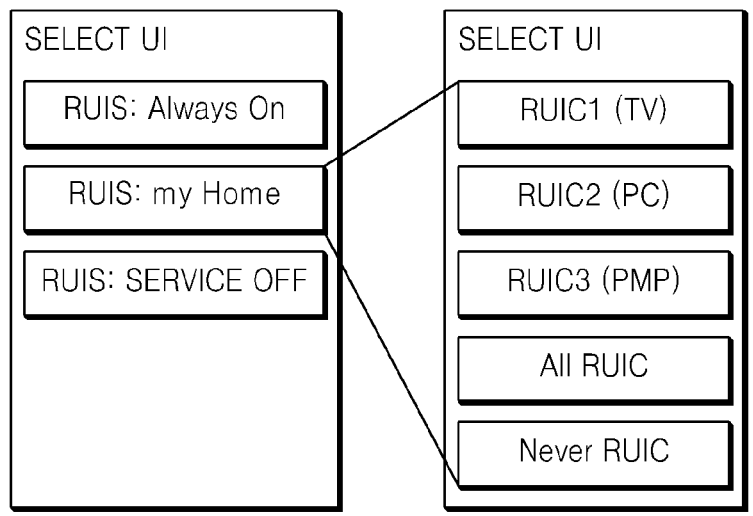
FIG. 8 is a diagram of an image provided by an RUIS, for selecting an RUIC that is to be notified about an event, according to an exemplary embodiment of the present invention.

FIG. 8 is a diagram of an image provided by n RUIS, for selecting a RUIC that is to be notified about an event, according to an exemplary embodiment of the present invention. When a user selects the RUIC from among RUICs belonging to the user home network, through the image illustrated in FIG. 8, the RUIS stores an ID of the selected RUIC that is to be notified about an event.

Referring again to FIG. 6, in operation 620, when an event occurs, it is checked whether a home network (hereinafter, referred to as the current home network) that is currently connected to the RUIS is the user home network. Also, in operation 610, by checking whether a RUIC selected as a standard RUIC is discovered, it may be checked whether the current home network is the user home network.

In operation 630, it is determined whether an event notification message is allowed to be transmitted in the current home network. When the current home network is the user home network, the event notification message is allowed to be transmitted. On the other hand, when the current home network is not the user home network, the event notification message is not allowed to be transmitted.

In operation 640, when the current home network is the user home network, the RUIS transmits the event notification message only to the selected RUIC that is to be notified about an event. When a plurality of RUICs are selected, the event notification message is transmitted using a multicast method. When a single RUIC is selected, the event notification message is transmitted using a unicast method.

According to the present exemplary embodiment, a user may prevent an RUIS from notifying an RUIC about an event occurring in the RUIS in a home network that is not a user's own home network. In addition, only a selected RUIC may notify n RUIC about an event in the user's own home network.

Alternatively, only a selected RUIC may generate an event page by using a general universal plug and play (UPnP) technology without a user selecting n RUIC that is to be notified about an event. Such a method will be described with reference to FIG. 9.

Figure 9:
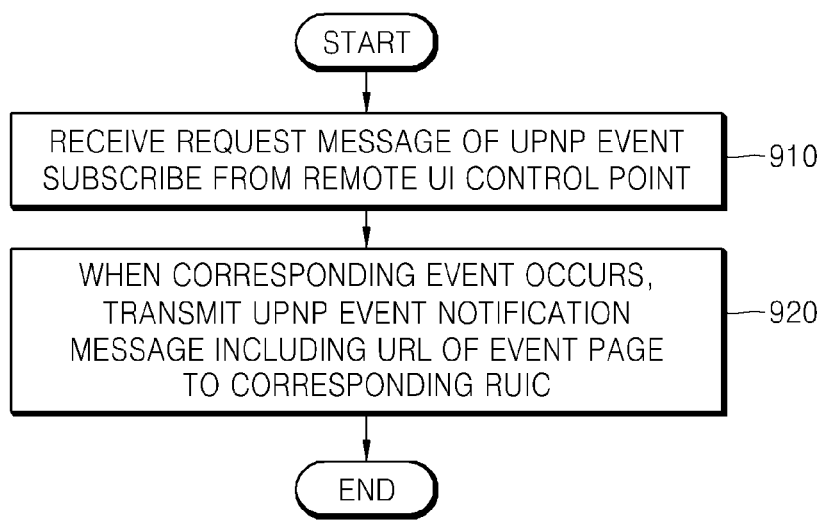
FIG. 9 is a flowchart of a method of notifying only a selected RUIC including a remote UI control point about an event, which is performed by an RUIS, according to an exemplary embodiment of the present invention.

FIG. 9 is a flowchart of a method of notifying a selected RUIC including a remote UI control point about an event, which is performed by an RUIS, according to an exemplary embodiment of the present invention.

In the present exemplary embodiment, the RUIS notifies only the selected RUIC about an event by using a general UPnP Event transmitting method. In the general UPnP event transmitting method, when an event occurs, a UPnP event notification message for notifying the RUIC about the event is transmitted only to a device subscribing to the UPnP event. According to the present exemplary embodiment, the UPnP event notification message including a URL for reproducing a related user interface (UI) is transmitted to the device which has subscribed to UPnP event, and when the device receives an event, the device may provide event information by reproducing the UI or the transmitted URL.

In operation 910, the RUIS receives a request message to subscribe to the UPnP event with respect to a selected service from the remote UI control point. For example, a user subscribes to a short message service of a cellular phone in which the RUIS is embedded, through a TV in which the RUIC is embedded.

In operation 920, when a corresponding event occurs in the RUIC, a UPnP event notification message is transmitted to the RUIC, that is, a UPnP control point subscribing to the UPnP event. In this case, the UPnP message includes a URL of an event page. The RUIC receiving the UPnP event notification message may reproduce the event page. Thus, only the RUIC subscribing to the UPnP event may generate the event page.

FIG. 10 is a block diagram illustrating a structure of an RUIS device 1000 according to an exemplary embodiment of the present invention.

Referring to FIG. 10, the RUIS device 1000 includes a setting unit 1010, a memory 1020, an estimation unit 1030, an authentication performing unit 1040 and an event page providing unit 1050.

The setting unit 1010 performs environmental settings so that only a selected RUIC is notified of an event in a selected home network, according to user's input. Thus, an ID of a standard RUIC, and IDs of RUICs that are to be notified about an event are stored in the memory 1020.

The estimation unit 1030 determines whether a current home network is a user home network.

The authentication performing unit 1040 performs an authentication process with respect to an RUIC that accesses an event page, through an HTTP GET command. The authentication performing unit 1040 includes an event notification unit 1041, an authentication information receiving unit 1042 and a determining unit 1043.

When the estimation unit 1030 determines that the current home network is the user home network, the event notification unit 1041 transmits the event page to an RUIC selected by a user in a multicast or unicast method. When a plurality of RUICs are selected, the event page is transmitted using a multicast method. When a single RUIC is selected, the event page is transmitted using a unicast method.

The event notification unit 1041 may transmit an event notification message including an authentication page, whose URL is replaced with a URL of the event page, to the RUIC in order to request authentication information of the RUIC.

When the URL of the event page of the event notification message is replaced with the URL of the authentication page, the authentication information receiving unit 1042 receives the authentication information input by a user from the RUIC through an HTTP POST command using the authentication page. Alternatively, when the URL of the event page is included in the event notification message, the authentication information receiving unit 1042 transmits an HTTP 401 Login Required message in response to a HTTP GET command with respect to the event page, and receives the authentication information input by the user from the RUIC through the HTTP GET command by using an authentication window in response to the HTTP 401 Login Required message.

The determining unit 1043 determines whether the authentication information input to the RUIC by the user is correct, with respect to authentication information that is previously stored in the memory 1020, and then determines whether user authentication is successful.

When the determining unit 1043 determines that the user authentication is successful, the event page providing unit 1050 transmits the event page to the RUIC.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A method of notifying a first apparatus about an event occurring in a second apparatus in a home network, the method comprising:
performing, in response to an event occurring in the second apparatus, authentication with respect to the first apparatus;

determining whether the first apparatus is authorized to display the event based on a result of the authentication; and selectively transmitting an event page indicating content of the event, based on a result of the determination, to the first apparatus, wherein the performing the authentication comprises transmitting, in response to the event occurring in the second apparatus, an event notification message which notifies the first apparatus of the event and which provides an authentication page for performing the authentication, wherein a same event notification message notifies the first apparatus of the event and provides the authentication page for performing the authentication, and wherein the authentication page includes displayed information regarding the authentication.

2. The method of claim 1, wherein the performing the authentication further comprises:

receiving authentication information input to the authentication page through an HTTP POST command; and determining whether the authentication is successful based on the authentication information, wherein the event notification message is a message in which a uniform resource locator (URL) of an event page is replaced with a URL of the authentication page.

3. The method of claim 1, wherein the performing the authentication comprises:

transmitting an HTTP 401 Login Required message in response to an HTTP GET command with respect to the event page;

receiving authentication information input to the authentication page through the HTTP GET command; and determining whether the authentication is successful based on the authentication information.

4. A non-transitory computer readable recording medium having recorded thereon a program for causing a computer to execute a series of operations for notifying a first apparatus about an event occurring in a second apparatus in a home network, the series of operations comprising:

performing, in response to an event occurring in the second apparatus, authentication with respect to the first apparatus;

determining whether the first apparatus is authorized to display the event based on a result of the authentication; and selectively transmitting an event page indicating content of the event, based on a result of the determination, to the first apparatus, wherein the performing the authentication comprises transmitting, in response to the event occurring in the second apparatus, an event notification message which notifies the first apparatus of the event and which provides an authentication page for performing the authentication, wherein a same event notification message notifies the first apparatus of the event and provides the authentication page for performing the authentication, and wherein the authentication page includes displayed information regarding the authentication.

5. An apparatus for notifying a first apparatus about an event in a second apparatus in a home network, the apparatus comprising:

an authentication performing unit that performs, in response to an event occurring in the second apparatus, authentication with respect to the first apparatus and determines whether the first apparatus is authorized to display the event; and an event page providing unit that selectively transmits an event page indicating content of the event, based on a result of the determining, to the first apparatus, wherein the authentication performing unit transmits, in response to the event occurring in the second apparatus, an event notification message which notifies the first apparatus of the event and which provides an authentication page for performing the authentication, wherein a same event notification message notifies the first apparatus of the event and provides the authentication page for performing the authentication, and wherein the authentication page includes displayed information regarding the authentication.

6. The apparatus of claim 5, wherein the authentication performing unit comprises:

an event notification unit that transmits the event notification message in which a uniform resource locator (URL) of an event page is replaced with a URL of the authentication page;

an authentication information receiving unit that receives authentication information input to the authentication page through an HTTP POST command; and a determining unit that determines whether the authentication is successful based on the authentication information.

7. The apparatus of claim 5, wherein the authentication performing unit comprises:

an authentication information receiving unit that transmits an HTTP 401 Login Required message in response to an HTTP GET command with respect to the event page and receives authentication information input to the authentication page through the HTTP GET command; and a determining unit that determines whether the authentication is successful based on the authentication information.

8. A method of notifying at least one of first apparatuses in a current home network an event occurring in a second apparatus, the method comprising:

determining, in response to the event occurring in the second apparatus, whether the current home network that is currently connected to the second apparatus is a selected home network that is allowed to be notified about the event; and selectively transmitting an event notification message, which notifies the first apparatus of the event, and an event page indicating the event to at least one of first apparatuses belonging to the current home network based on a result of the determining, wherein a same event notification message notifies the first apparatus of the event and provides an authentication page for performing an authentication, and wherein the authentication page includes displayed information regarding the authentication.

9. The method of claim 8, wherein the determining comprises:

determining whether a first apparatus belonging to the current home network is a selected first apparatus; and wherein the selectively transmitting comprises:

selectively transmitting the event page indicating the event to the selected first apparatus belonging to the current home network based on the result of the determining.

10. The method of claim 8, wherein the transmitting comprises transmitting the event page to at least one of first apparatuses that is previously selected by a user's input, in one of a unicast and a multicast method.

11. A non-transitory computer readable recording medium having recorded thereon a program for causing a computer to execute a series of operations for notifying at least one of first apparatuses in a current home network an event occurring in a second apparatus, the series of operations comprising:
   determining, in response to the event occurring in the second apparatus, whether the current home network that is currently connected to the second apparatus is a selected home network that is allowed to be notified about the event; and
   selectively transmitting an event notification message, which notifies the first apparatus of the event, and an event page indicating the event to at least one of first apparatuses belonging to the current home network based on a result of the determining,
   wherein a same event notification message notifies the first apparatus of the event and provides an authentication page for performing an authentication, and
   wherein the authentication page includes displayed information regarding the authentication.

12. An apparatus for notifying at least one of first apparatuses in a current home network about an event occurring in a second apparatus, the apparatus comprising:
   an estimation unit that determines, in response to the event occurring in the second apparatus, whether the current home network that is currently connected to the apparatus is a selected home network that is allowed to be notified about the event; and
   an event page providing unit that selectively transmits an event notification message, which notifies the first apparatus of the event, and an event page indicating the event to at least one of first apparatuses belonging to the current home network based on a result of the determining,
   wherein a same event notification message notifies the first apparatus of the event and provides an authentication page for performing an authentication, and
   wherein the authentication page includes displayed information regarding the authentication.

13. The apparatus of claim 12,
   wherein the estimation unit determines whether a first apparatus belonging to the current home network is a selected first apparatus, and
   wherein the event page providing unit selectively transmits the event page indicating the event to the selected first apparatus belonging to the current home network based on the result of the determining.

14. The apparatus of claim 12, wherein the event page providing unit transmits the event page to at least one of first apparatus that is previously selected by a user's input, in one of a unicast and a multicast method.

* * * * *